United States Patent [19]

Bowles

[11] 4,082,169
[45] Apr. 4, 1978

[54] ACCELERATION CONTROLLED FLUIDIC SHOCK ABSORBER

[76] Inventor: Romald E. Bowles, 2105 Sondra Ct., Silver Spring, Md. 20904

[21] Appl. No.: 640,186

[22] Filed: Dec. 12, 1975

[51] Int. Cl.$^2$ .............................. F16F 9/34; F16F 9/50
[52] U.S. Cl. ...................................... 188/322; 137/38; 137/810; 188/275
[58] Field of Search ................ 188/275, 322; 137/810, 137/808, 809, 812, 813, 38

[56] References Cited

U.S. PATENT DOCUMENTS

| | | | |
|---|---|---|---|
| 2,740,500 | 4/1956 | Brundrett et al. | 188/322 |
| 3,127,958 | 4/1964 | Szostak | 188/275 |
| 3,256,899 | 6/1966 | Dexter et al. | 137/809 |
| 3,302,756 | 2/1967 | McIntyre | 188/322 X |
| 3,362,508 | 1/1968 | Mayer | 188/319 |
| 3,380,560 | 4/1968 | Katz | 188/275 |
| 3,515,160 | 6/1970 | Cohen | 137/812 X |
| 3,672,474 | 6/1972 | Mayer et al. | 188/282 |

FOREIGN PATENT DOCUMENTS

| | | | |
|---|---|---|---|
| 1,125,267 | 7/1956 | France | 188/275 |
| 1,045,256 | 11/1958 | Germany | 188/275 |

*Primary Examiner*—George E. A. Halvosa
*Attorney, Agent, or Firm*—Rose & Edell

[57] ABSTRACT

The invention provides a shock absorber for wheeled and track type vehicles in which the conventional compression valve is replaced by an acceleration controlled vortex throttle. A beam deflection amplifier introduces fluid radially, tangentially or at an intermediate position into a vortex chamber under control of an accelerometer. The vortex throttle is controlled such that in the presence of acceleration of a wheel relative to the ground shock motion is lightly resisted while long term movement of the wheel toward the vehicle is strongly resisted so that the wheel more closely follows the terrain contour with reduced energy delivered by the wheel to the vehicle body.

6 Claims, 10 Drawing Figures

ACCELERATION CONTROLLED FLUIDIC SHOCK ABSORBER

BACKGROUND OF THE INVENTION

The present invention relates to shock absorbers and more particularly to shock absorbers employing acceleration controlled vortex throttles.

The suspension system of a wheeled vehicle has two fundamental goals. They are: first to protect the payload from excessive acceleration, excessive velocities and excessive displacements, and second to keep the wheel in contact with the ground so as to retain controllability of the vehicle as it traverses the terrain. Springs provide a suspension force level dependent upon relative position of wheel and vehicle body.

A shock absorber is a device placed between the axle and vehicle body, designed to absorb energy of relative motion between the axle and vehicle body. Ideally, it should consider motion relative to an earth reference for the vehicle body, and motion relative to the terrain surface for the wheel. The shock absorber must then dissipate the energy of relative motion to the surrounding environment so that the shock absorber does not over-heat and self-destruct.

Most current shock absorbers are piston-cylinder arrangements using hydraulic fluid as a working medium. The hydraulic fluid is forced through an orifice and in going through the orifice is accelerated to a high velocity and stores kinetic energy. When the fluid exits from the orifice, it dissipates its kinetic energy through turbulence into heat which results in a higher temperature for the hydraulic fluid. This heat is dissipated by conduction and convection to the surrounding air for a conventional vehicle. To permit some decision on the part of the shock absorber as to how much of a resisting force it is going to develop or how much energy it is going to absorb, and to permit it to absorb different amounts for compression and rebound, one orifice is used for compression and another orifice is used for rebound.

One of the problems with a simple orifice is that the force developed varies as the square of the rate at which the shock is changing length in that this length is proportional to the velocity with which fluid is forced through the orifice. This means that the shock is soft or low velocities and hard for higher velocities. It is desirable that this not occur. For that reason, more sophisticated valving systems have been developed which permit the area of the orifice to change so as to accommodate the higher pressures associated with high shock velocities.

The major problem with the conventional shock absorber is it has very limited input information. By examining the internal hydraulic pressure, it reaches a conclusion as to the rate of closing or rate of extension of the shock absorber and based on this information, adjusts its damping coefficient accordingly. As a consequence, the shock absorber system has a very limited intelligence. Of necessity, therefore, its damping characteristics are selected as a fixed compromise. This compromise considers the total exposure anticipated within the terrain-vehicle-speed operating envelope.

Selection of the best shock absorber system for a new vehicle is approximated at the drawing board, but selection is finalized by an expert who rides in the vehicle and makes judgements of modification to achieve his optimum compromise of shock ratio, nose angle and degree of control for each of the various stages of shock absorber valving, etc. Consequently, conventional shock absorbers usually operate in an off-design point condition.

There are three major problem areas which remain unsolved as a result of the limited information that is currently available in conventional shock absorbers and the method of operation which is forced upon it by its current limited information processing capability. There are: (1) The unit absorbs more energy than is necessary and this sometimes leads to catastrophic failure of the unit; (2) The unit applies a less than optimum forcing function to the vehicle; (3) The wheel ground-contact time integral is decreased. This has an adverse influence on vehicle dynamics. It limits the vehicle terrain speed performance which is truly usable and thus limits system effectiveness.

SUMMARY OF THE INVENTION

In accordance with the present invention there is provided an adaptive fluidic shock absorber incorporating sensors. These sensors are designed to provide information to the shock absorber which permits it to make a more intelligent decision regarding what force should be generated.

The sensor provided is a fluidic wheel accelerometer mounted within the shock absorber as a part of the compression valve system which provides information used to estimate the forthcoming terrain contour (based on current wheel acceleration).

Because the information available to the conventional shock absorber is so fundamental, i.e., it is only available as pressure level, resulting information processing must be very simple. In the conventional shock absorber, the information processing consists of looking at the information to see whether the pressure is demonstrating a compression or extension. This information brings into play one of two sets of valves. The information processing then further examines the pressure level to decide which of the valve ports are going to be opened, and to what extent they will be open, in order to provide a desired relationship between pressure level and the corresponding fluid flow rate that is desired.

When a greater amount of information is available from the sensor as in the present invention, it is possible to use a more sophisticated information processing system.

A prerequisite for making use of sophisticated information processing is an ability to utilize the information, in the present case, to vary the damping coefficient, in response to such information. Such a capability of the shock absorber is provided by a variable vortex throttle.

The variable vortex throttle employs a fluidic beam deflection amplifier supplying fluid to a vortex valve. In operation, acceleration responsive control fluid is applied to the control ports of the beam deflection amplifier. This fluid causes a jet issuing from the power nozzle of the amplifier to be deflected and proportion itself between radial outlet and tangential outlet passages of the amplifier, i.e., one outlet passage supplying fluid radially to the vortex chamber and the other outlet supplying fluid tangentially to the vortex chamber.

When fluid flow enters the vortex chamber tangentially it spirals toward the flow discharge exit at the center of the vortex chamber. Under such conditions, for a given flow rate the pressure drop across the system is maximum, or for a given pressure drop across the system, the flow rate is minimum. When flow enters the chamber radially fluid flows directly across the chamber with no spin, to the flow discharge exit. As a result of such flow, for a given flow rate the pressure drop across the vortex chamber is minimal and pressure drop across the system is minimal, or for a fixed pressure drop across the system, the flow is maximum.

If the power jet beam is deflected so that it flows partially tangentially and partially radially, the subsystem effective flow area lies between its maximum and minimum values. Thus by suitably proportioning the power jet between the tangential and radial outlets, the effective flow area of this subsystem is varied between its maximum value and its minimum value, as desired.

As previously indicated the acceleration sensor is employed to produce modification of the shock absorber damping coefficient during the compression portion of the cycle. This concept requires incorporation of the fluidic capabilities described above in the compression valve of the conventional shock absorber. Fundamentally the system monitors wheel acceleration and as a result, predicts terrain conditions.

Specifically, the damping level during compression is proportionally varied between a maximum effort at zero vertical acceleration and for example one tenth that effort at a preselected maximum absolute amplitude of vertical acceleration such as /25 g/. The result is to maximize energy absorbed by the shock absorber when it can be effective, and reduce energy absorbed by the shock absorber when it is ineffectual.

When a single, short bump in a highway is encountered, the wheel encounters an acceleration transient which is first large and positive as the bump is first encountered, then zero as maximum vertical velocity is attained by the wheel, then negative as the spring and shock accelerate the wheel toward the ground, then through zero and again positive as the wheel encounters and is accelerated by the ground, etc.

The non-zero wheel acceleration levels cause the shock absorber to exert less than maximum force levels and present a soft suspension system during the traverse of this bump. Maximum damping effort resumes when wheel acceleration level is zero. The damping effort reduction is proportional to the acceleration absolute level with the softest suspension system at an acceleration absolute level of for instance /25 g/.

The relationship between the acceleration sensor and the variable vortex throttle is such that when vertical acceleration of the wheel is zero, the flow is in a tangential mode and provides maximum pressure drop for a given flow. When the vertical acceleration is upwards, i.e. +25 g's, then the acceleration sensor causes flow to be in the radial mode, and provide minimum damping. When acceleration is intermediate zero and +25 g's, then the flow will be intermediate the radial and tangential modes, that is, there will be some spin but not as much as in the fully tangential mode. The damping coefficient which results is intermediate the two extremes previously mentioned, depending upon the level of positive acceleration.

Further, when the vertical acceleration of the wheel is a negative 12.5 g's, the flow to half-way intermediate to tangential and radial modes. Thus a linear relationship between the vertical acceleration and the resistance of this variable vortex throttle system provides the desired relationship between damping coefficient and wheel acceleration. The damping for negative acceleration levels is an analog variation, just as is the damping for positive acceleration levels.

The net effect of the preceding is to cause the compression portion of the cycle of the shock absorber to adapt to the terrain conditions and permits providing a maximum damping coefficient when the wheel is not being accelerated by the terrain condition, yet modulates the damping coefficients in accordance with the type of terrain variation being encountered so as to provide a maximum effectiveness. When the wheel is being forced up by a change of terrain slope, the shock absorber does not resist significantly. Only after it is determined that this change is going to persist (reduced acceleration) does the shock absorber go to an increased damping coefficient. If the terrain condition has stabilized so that the wheel is rising for example at constant velocity, the shock absorber goes to a maximum damping condition in order to cause the vehicle to follow the slope of the terrain. Thus, if the terrain contour change is significant the shock absorber tries to absorb a maximum amount of energy.

It is an object of the present invention to provide a vortex throttle for shock absorbers.

Another object of the present invention is to provide an acceleration controlled shock absorber.

Yet another object of the present invention is to provide a shock absorber that strongly resists prolonged movement of the wheel of a vehicle relative to the vehicle and lightly resists short term such movements.

While we have described and illustrated specific embodiments of our invention, it will be clear that variations of the details of construction which are specifically illustrated and described may be resorted to without departure from the true spirit and scope of the invention as defined in the appended claims.

Figures 1, 2, 3:
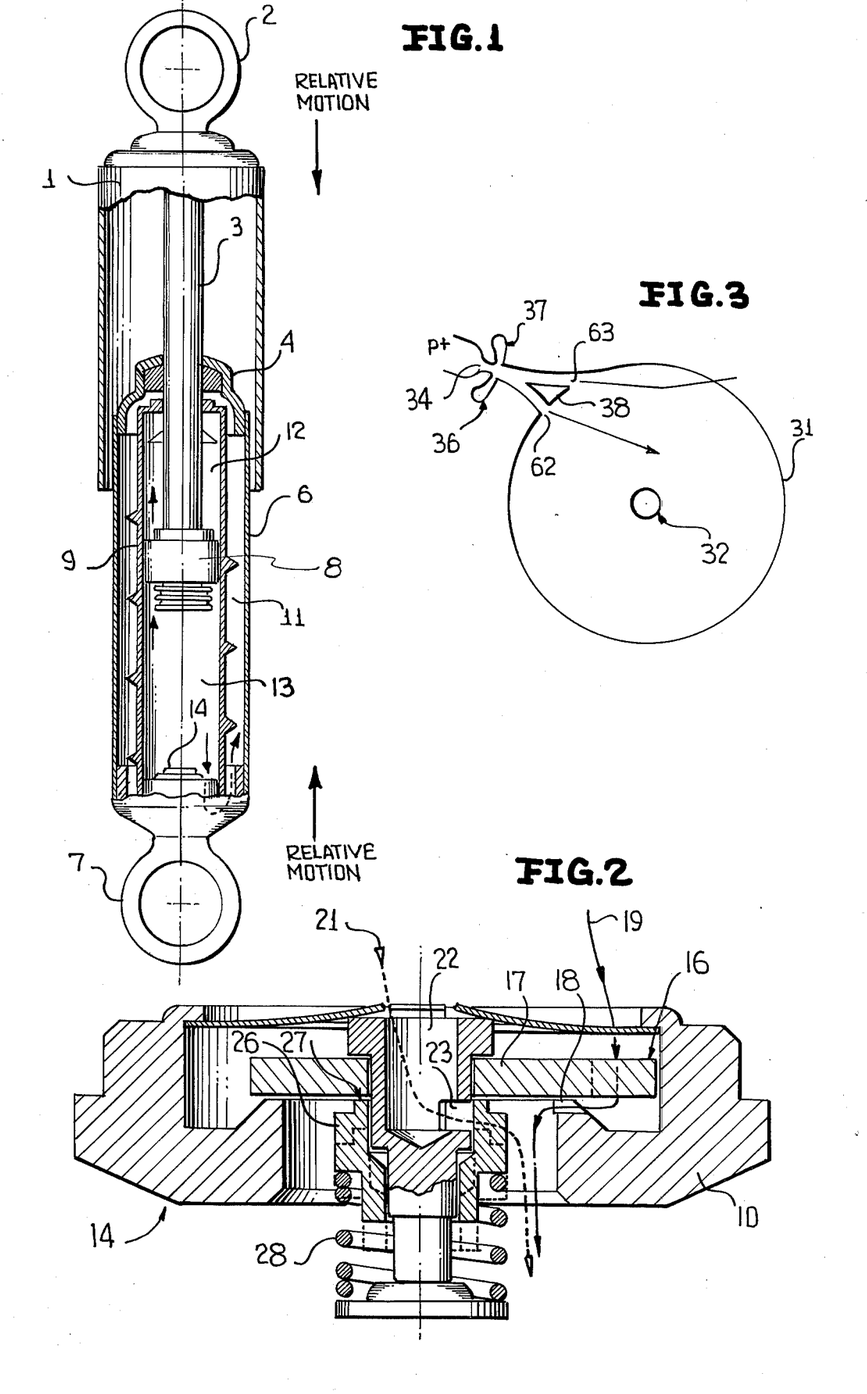
FIG. 1 is a sectional view in elevation of a conventional shock absorber.
FIG. 2 is a sectional view in elevation of the conventional compression valve of the shock absorber of FIG. 1.
FIG. 3 is a diagrammatic view of the beam deflection amplifier controlled vortex throttle employed in the present invention.

Referring now specifically to FIG. 1 of the accompanying drawings there is illustrated a conventional shock absorber mechanism comprising a mud shield 1, a vehicle body end fitting 2 connected to the mud shield and to a piston rod 3. The piston rod shaft 3 passes through a suitable seal 4 into a shock absorber housing 6 having a wheel end fitting 7 secured to its lower end as viewed in FIG. 1. A hollow cylindrical body 9 is disposed within the housing 6 and is spaced therefrom to define a chamber 11 for storing shock absorber hydraulic fluid. A piston valve 8 secured to the lower end of shaft 3, is dispersed in housing 9 and defines a chamber 12 above the valve and a chamber 13 below the valve. Flow of fluid between chambers 12 and 13 is controlled by the piston valve 8. Fluid flow from chamber 13 into the region 11 defined between housing 6 and hollow cylinder 9 is controlled by a compression valve 14 of the general design illustrated in FIG. 2 of the accompanying drawings.

In operation, during compression fluid flows through controlled orifices in the valve 8 from the chamber 13 into the chamber 12 in response to the differential in pressure between these two chambers. Under the conditions of compression the wheel rises relative to the body. Pressure in the chamber 13 is greater than in the chamber 12 unseating the valve which is a completely conventional design and permits flow between the two chambers. Concurrently the valve 14 permits flow between chamber 13 and chamber 11, this flow being a function of the velocity at which the wheel rises towards the vehicle body.

In conventional shock absorbers, the valve 14 comprises two stages, a primary and a secondary stage. Referring to FIG. 2, the primary flow is downward along a path 19, through appropriately located orifices or peripheral indentations 16 in what is commonly called a star flapper 17 and thence through a notched region or regions 18 formed in a primary valve surface 27, the notch 18 defining the standard shock absorber primary orifice. When the velocity of the wheel towards the vehicle exceeds a predetermined velocity, a second path indicated by arrow 21 between the chamber 13 and region 11, is opened through a central passage 22 and an orifice formed by a slot 23 in the side of what is known conventionally as a secondary valve body 24 and a secondary valve collar 26. The slot 23 is exposed by downward movement of secondary valve collar 26 of the conventional valve. Normally valve surface 27 of the secondary valve collar 26 engages bottom surface as viewed in FIG. 2 of the star flapper 17 sealing the orifice 23. However, when velocity of the wheel towards the body exceeds a predetermined velocity, thus creating a specific pressure difference between chambers 13 and 11, compression spring 28 is compressed unseating secondary valve collar 26 from the flapper 17 and flow now proceeds along the path 21 as well as along the path 19. The characteristics of this type of valve are illustrated as Curve A in FIG. 8, with flow through the orifice 23 increasing with velocity as collar 26 is moved increasingly downward as a function of pressure difference between chambers 13 and 11 as the wheel moves towards the vehicle body.

During an extension cycle with a wheel moving downwardly relative to the vehicle body, fluid flows along the path 19 in reverse direction. When the extension velocity and therefore pressure differential is great, the star flapper 17 is unseated relative to the valve body 10 so as to permit increased flow along path 19 in reverse direction.

As previously indicated the difficulty with prior art shock absorbers is that there is basically no control over its action. The operation of the compression valve is controlled strictly by velocity of compression which is not a true indication of the degree of energy absorption required. A brief but very illuminating example is where the velocity of the wheel towards the body is quite slow but the acceleration is great because the wheel is just encountering a large rapidly rising obstacle. The action of the shock absorber is thus very stiff since the pressure differential across the compression valve is high. The action of the shock absorber at this time however should be soft so as to permit the wheel to rise rapidly to avoid the bump in the terrain without causing the body of the vehicle to jump or move up very rapidly. Only if the wheel is stationary and shock motion due to body motion or if the wheel is moving and continues to move towards the body should the shock absorber become stiff to cause the vehicle body to follow the wheel; the above adaptability being beyond the capabilities of conventional absorber action. Referring now specifically to FIG. 3 of the accompanying drawings there is illustrated a variable vortex throttle system that is utilized in the present invention. The throttle valve comprises a vortex chamber 31 having a small central egress orifice 32 and a fluid amplifier, generally designated by the reference numeral 33, supplying fluid to the chamber at its outer periphery. Preferrably the vortex chamber 31 has, generally, the shape of a flat disk; that is, the height of the chamber is preferably of the order of four tenths the diameter of the chamber.

The fluid amplifier 33 comprises a power nozzle 34, control nozzles 36 and 37 and an output region generally designated by the reference numeral 38. Fluid which exits from the amplifier 33 may be directed radially into the chamber 31 so that it flows directly to the egress orifice 32. On the other hand the fluid may be caused to enter the chamber substantially tangentially in which instance the fluid follows a hellical path to the egress orifice 32. In the latter instance large amounts of the total pressure of the input stream are converted to spin kinetic energy in the chamber whereas when flow is radial a relatively small portion of the input total pressure of the fluid is converted to spin kinetic energy in the chamber. The operation of such devices both the amplifier and the vortex chamber are well known in the fluidics art.

Figure 4:
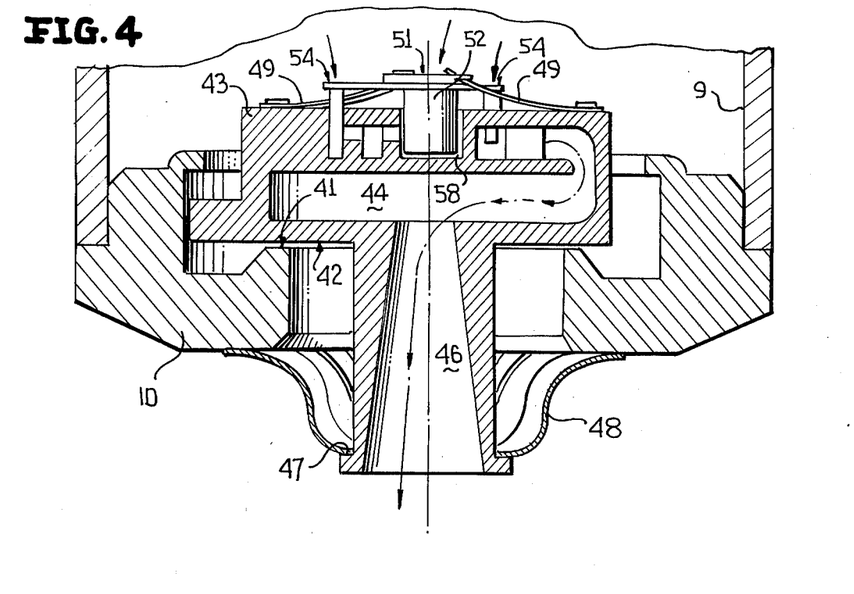
FIG. 4 is a sectional view of the present invention of one embodiment of the accelerometer controlled vortex throttle of the shock absorber of the present invention.
Figure 5:
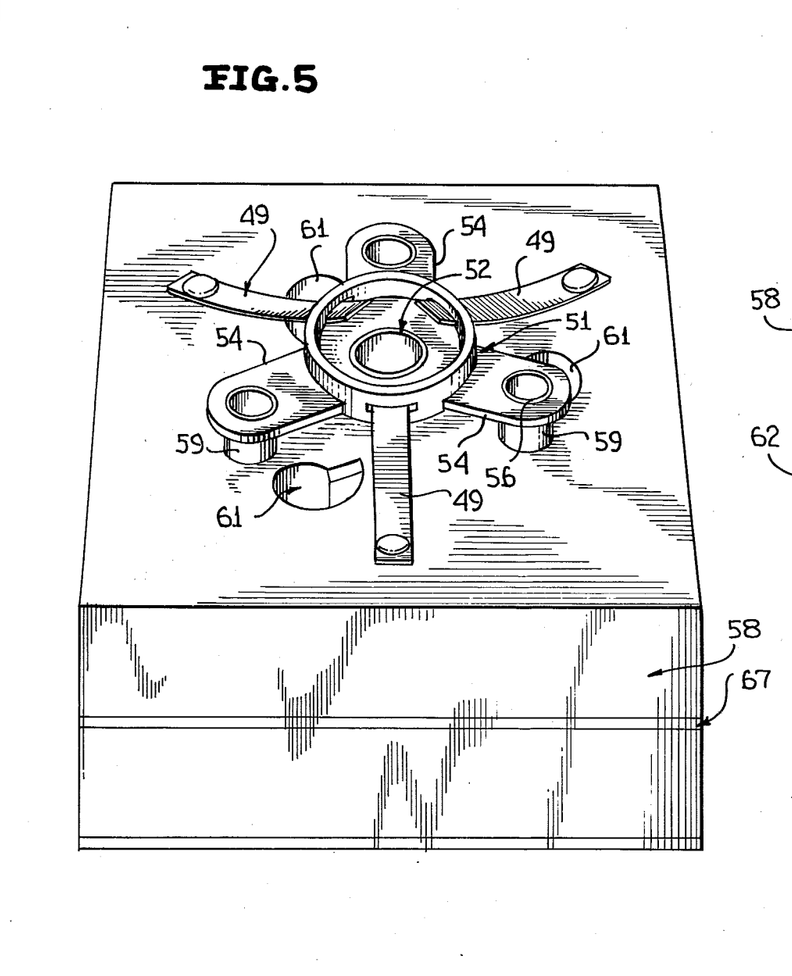
FIG. 5 is a top view of the accelerometer of the present invention.

In accordance with the present invention the apparatus of FIG. 3 is incorporated in a compression valve of a shock absorber such as is illustrated in FIG. 4. Further, in accordance with the present invention, the input to the vortex amplifier, i.e., where the input is radial or tangential, is determined by an accelerometer. The accelerometer controls the amplifier 33 such that at high acceleration rates of the wheel during its motion towards the body of the vehicle radial flow is produced in the vortex chamber while at low acceleration generally hellical flow is produced in the chamber. In the former case a relatively small proportion of the total pressure of the fluid is converted to spin kinetic energy in the chamber whereas during periods of relatively low acceleration of the wheel towards the body of the vehicle, a large proporation of the total pressure of the fluid is converted.

Referring to the example of the operation of the prior art shock absorber previously given above, the operation of the device of FIG. 4, is exactly contra thereto. In the present case, when the wheel encounters suddenly rising terrain, acceleration is rapid and flow to the vortex chamber is radial so that little resistance to flow is encountered and the wheel is permitted to move upwardly toward the vehicle body with little resistance. When the acceleration of the wheel decreases due to persistance of the rising terrain, the vortex flow becomes tangential, upward movement of the wheel is opposed and thus the vehicle body follows upward movement of the wheel; the desired result.

Referring now to FIGS. 4 to 7 of the accompanying drawings, a compression valve according to the present invention comprises a valve body 10 providing a valve seat 41 adapted to seat against the bottom surface 42 of fluidic control body 43. The body 43 includes a vortex chamber 44 having an output diffuser section 46. The outer surface of the diffuser section 46 adjacent its lower end is provided with an annular shoulder 47 to which is secuurred a spring spider 48 extending from the shoulder 47 of the diffuser to the bottom surface of the valve body 10. The spider 48 is utilized to control opening and closing of the valve defined between valve seat 41 and bottom 42 of the valve block 43 during a extension cycle. Pressure developed in the chamber 11, and more specifically reduced pressure developed in chamber 13 of the absorber illustrated in FIG. 1, produces a differential pressure across the vortex fluid valve body 43 causing the body to be lifted as illustrated in FIG. 4 against the force of the spider spring 48 and permit fluid to flow in an upward direction through the valve space between the seat 41 and wall 42. At other times the valve is closed.

As previously indicated the vortex device of the present invention is acceleration responsive. The accelerometer is provided by three leaf springs 49 located at 120° positions relative to one another and secured at their outer ends to the body or block 43. The springs support a mass, generally designated by numeral 51, hereinafter referred to as a shuttle. The mass of the shuttle is such, in conjunction with the springs 49, to provide an acceleration responsive mass for providing movement of the shuttle 51 as a function of acceleration of the wheel relative to earth coordinates. The shuttle 51 constitutes the control mechanism for the fluid amplifier 33 illustrated in FIG. 3. Specifically, and now reference is made to FIGS. 5, 6 and 7 of the accompanying drawings, the shuttle 51 comprises a central hollow cylinder 52 having slots 53 displaced about the periphery thereof at 120° angles.

The shuttle 51 has three 120° arrayed outwardly extending arms 54 each carrying perpendicular thereto a hollow cylindrical member 56 having appropriately shaped slots 57 formed therein. The member 52 and members 56 extend down into an amplifier block 58 in which is formed the analog fluid amplifier illustrated in FIG. 3. Specifically, as more fully illustrated in FIG. 6, there are three such amplifiers formed in the block 58 spaced generally at 120° angles relative to one another. Radial flow control ports 37 of each of the amplifiers 33, communicate with a central aperature 52 in the block 58 with each of the orifices or control slots 53 being aligned with a different one of the control passages 37. Thus as the shuttle 51 moves up and down vertically in response to acceleration, the opening between the interior of the sleeve 52 and the control ports 37 is varied and since the hollow tube 52 is opened into the chamber 11 of the shock absorber the amount of control flow into the control ports 37 is varied.

Figure 6:
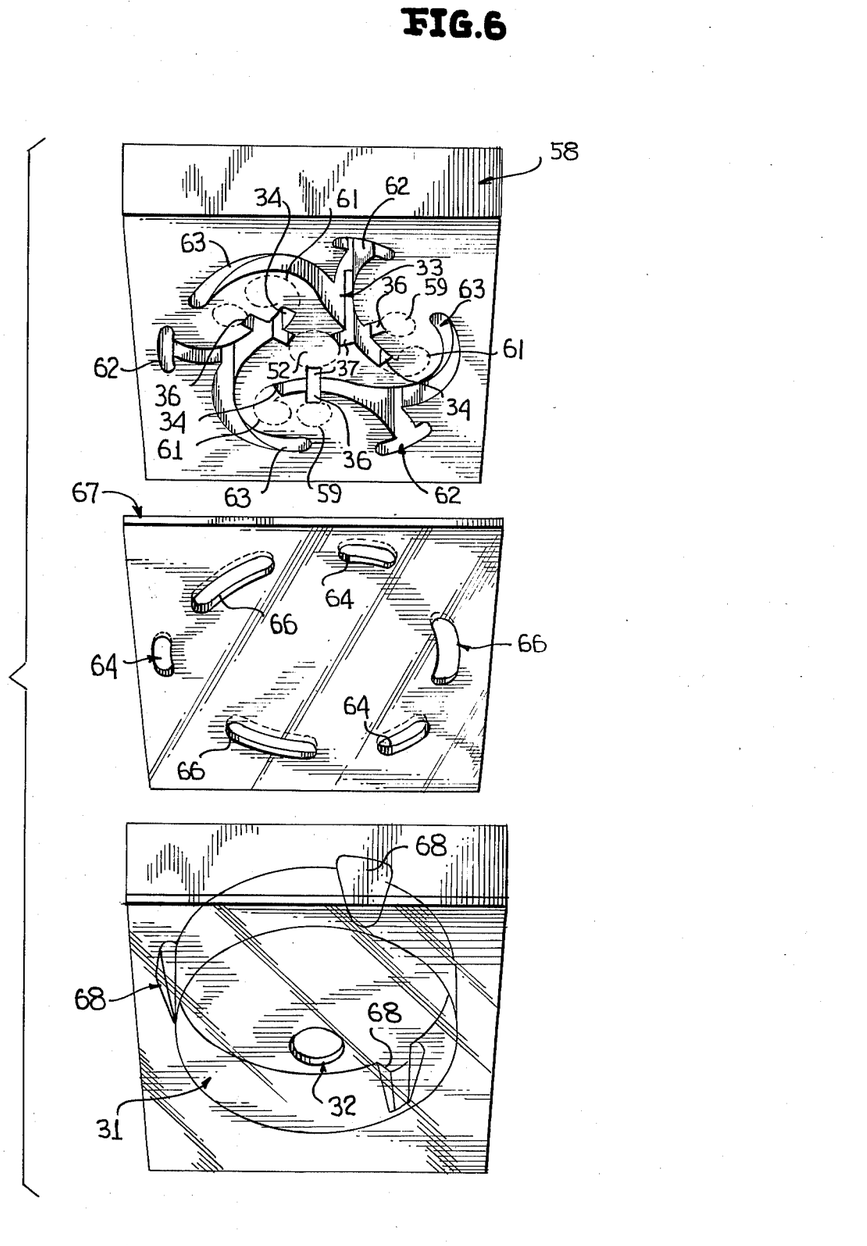
FIG. 6 is an exploded view of the beam deflection amplifiers and vortex throttle of the shock absorber of the present invention.
Figure 7:
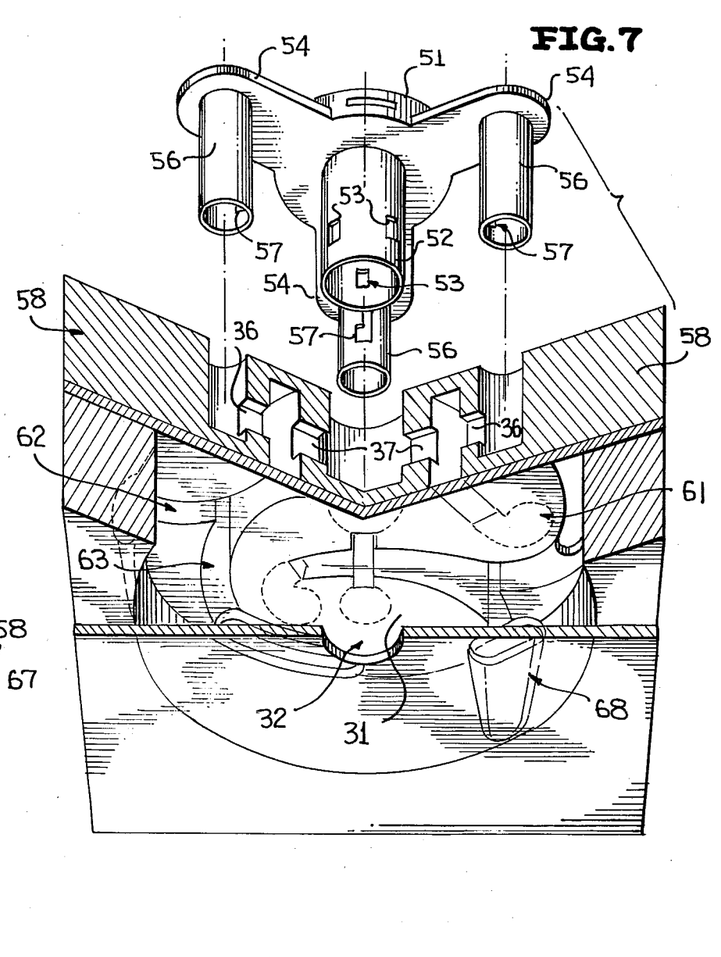
FIG. 7 is a composite view of the accelerometer and fluidic portion of the shock absorber.

Each of the hollow sleeves 56 of the shuttle 51 extends into a distinct cylindrical opening 59 in the block 58 and, as a function of the movement of the shuttle with acceleration, controls flow of fluid to tangential control flow ports 36 of the fluid amplifiers 33.

Each power nozzle 34 of the amplifier 33 is opened via a passage 61 to the chamber 13 above the amplifier block 58.

The amplifier 33 has a radial flow outlet leg 62 and a tangential flow outlet leg 63 which extend into communication with the vortex chamber through slots 64 and 66, respectively, formed in a transfer separator plate 67 disposed between the fluid amplifiers 33 and vortex chamber 31. The vortex chamber 31 is provided with radial flow insertion slots 68 which cause the fluid from the outlet leg 62 of the fluid amplifier to be directed basically uniformly along the base of the vortex chamber so as to flow with little resistance through the chamber 31 towards the outlet opening or egress orifice 32.

It can be seen from the above that in the absence of acceleration of the wheel towards the body, the flow in the chamber is substantially completely tangential, that in the presence of acceleration above a prescribed maximum level the flow is substantially radial and that in the presence of intermediate levels of acceleration, the flow is at some position between wholly radial and wholly tangential.

In any system of the type illustrated in FIG. 3 the drop across the vortex unit consists of three parts: the drop in the diverter valve or fluidic amplifier 33 in the variable drop across the vortex unit, and the exit loss from the vortex unit diffusor. It is apparent from the preceeding discussions, that it is desirable to make as large a proportion of the drop variable as possible since such operation provides the greatest range of control. If the vortex were permitted, and in some instances it may be, to exit directly from the vortex chamber into the region 11 of the shock absorber, a relatively large uncontrolled exit loss from the chamber is experienced. Thus the total proportion of pressure drop that is variable is not as great as otherwise may be desirable in some instances. The diffuser however serves to reduce the exit loss from the vortex chamber. The total pressure drop across the arrangement is less with a diffuser than it is without a diffuser however the variable proportion of the drop is greater and thus the control function is greater than otherwise would be the case without the diffuser.

Figure 8:
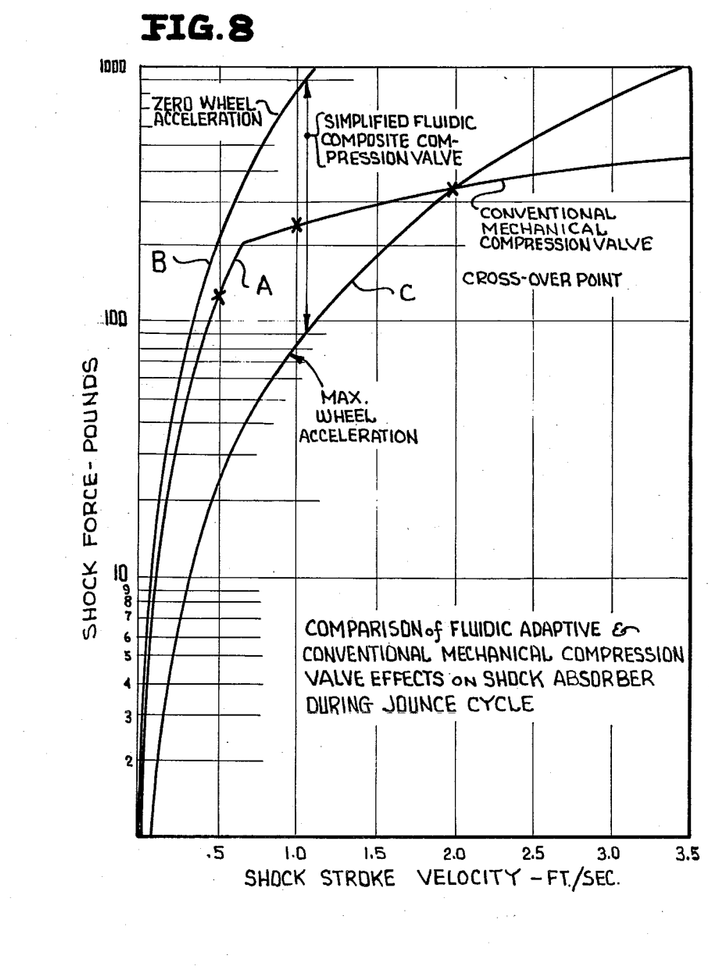
FIG. 8 is a plot of the performance characteristics of the prior art and present shock absorbers.

Referring now specifically to FIG. 8 of the accompanying drawings, the shock stroke velocity of the wheel versus shock force imparted to the vehicle is plotted for zero wheel acceleration, Curve B and the maximum wheel acceleration, Curve C. It will be noted that the corresponding curve for the conventional mechanical compression valve, Curve A, lies within the region between Curves B and C for a control range of up to 2 feet per second velocity. Within the range between Curves B and C of FIG. 8, lies the control range for the vortex valve control of FIG. 4. With the valve providing control as a function of acceleration of the wheel it is apparent from the graph that the damping coefficient of the valve is modified in accordance with the type of terrain variation being encountered so as to produce maximum effectiveness of the shock absorber. When the wheel is initially forced up by a change of terrain, the shock absorber does not resist significantly. Only after it is determined that this change will persist does the shock absorber develop an increased damping coefficient since the persistent change results in reduced acceleration and increased velocity. When the terrain conditions stabilize so that the wheel is rising at a fixed rate, the shock absorber goes to a maximum damping condition in order to cause the vehicle to follow the slope of the terrain.

When the terrain begins to fall away so that the pressure across the valve of FIG. 4 is reversed, then fluid flows from chamber 11 to 13 through and past the valve seat 41 as part of the extension or rebound portion of a cycle and shock forces are determined by the piston valve and not by the fluidic compression valve.

Changes in positive acceleration of a wheel from a very rapid acceleration to a lesser acceleration causes the damping factor to vary between the Curves B and C thus automaticall proportioning the degree to which the shock absorber develops a force during the compression cycle as a function of such a change.

Figure 9:
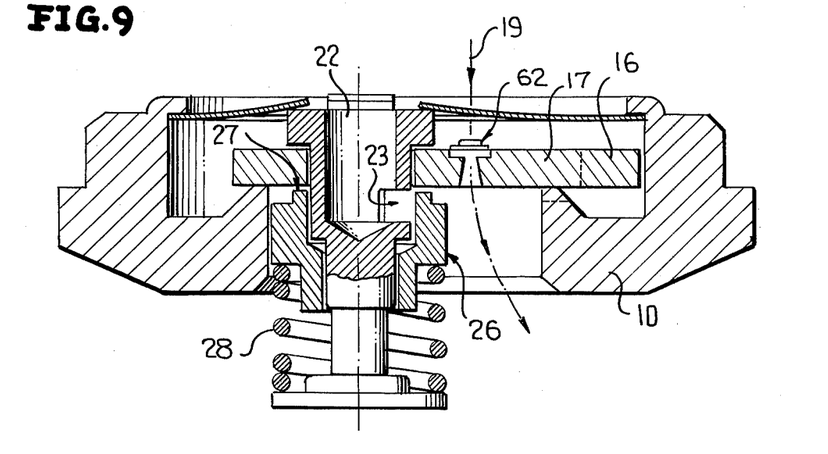
FIG. 9 is a view in section of a modified form of the shock absorber of the present invention.

The apparatus of FIG. 4 is designed for maximum forces in the range of 1000 lbs. and as can be seen from the graph, shock closing velocities in the neighborhood of 2 to 2½ feet per second. In certain situations these factors may be greatly exceeded. Certain types of vehicles and for certain systems these factors may be greatly exceeded and an apparatus having a considerably greater capacity may required. For instance forces of a thousand pounds may be encountered with wheel velocities relative to the body of 5 inches per second as opposed to the 2 feet per second of the apparatus of FIG. 4. If such forces cannot be readily accomodated by a device such as illustrated in FIG. 4 than a composite apparatus such as illustrated in FIG. 9 may be employed. Reference to FIG. 9 makes it immediately apparent that the vortex device of FIG. 9, generally designated by the reference numeral 62, is represented as considerably smaller than the vortex device in FIG. 4. In fact, however, the devices are of the same size, the device of FIG. 4 being illustrated considerably larger than it actually is for purposes of clarity only.

In FIG. 9 the vortex device 62 is mounted in star flapper 17 but otherwise the apparatus of FIG. 9 is substantially identical with the apparatus illustrated in FIG. 2. The compression spring 28 of FIG. 9 however is proportioned to operate at approximately 550 lbs. so that the operation of the device for accelerations of for instance, up to about 2 feet per second is substantially identical with that illustrated in FIG. 4. However, at velocities over two feet per second such generating forces in the region of 500 to 550 lbs., the valve seat 27 becomes unseated from the plate 16 and a flow is permitted through this valve via passage 22, slot 23 and as previously indicated through the opening between members 26 and 17.

Figure 10:
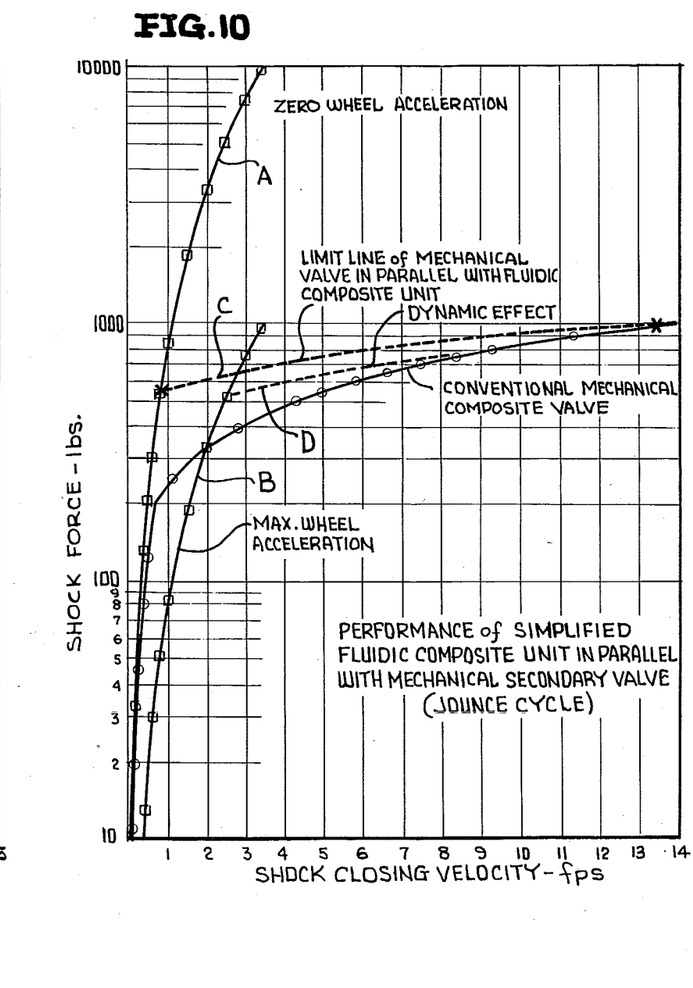
FIG. 10 is a plot of the performance characteristics of the apparatus of FIG. 9.

The graph of the operation of the valve of FIG. 9 is illustrated in FIG. 10. In FIG. 10 Curve A is the zero wheel acceleration and Curve B is the maximum wheel acceleration. The mechanical valve comprising compression spring 28, slot 23 and valve collar 26 comes into operation at a force level of 550 lbs. At zero wheel acceleration this corresponds to a shock closing velocity of approximately 0.8 fps and at maximum wheel acceleration a velocity of 2.5 fps. It will be noted that even when the mechanical valve has opened, there is a dynamic range of control between the Curves C and D so that some further control over and above that available from a purely mechanical prior art type valve is provided through considerable range of acceleration.

The vortex throttle is quite important in the present system in that it effectively isolates the accelerometer from the great pressure differential, as much as 6000 psi, across the compression valve. The pressure differential is velocity sensitive and the exposure of even a small surface of the accelerometer or accelerometer responsive physical device would materially alter system response. The vortex throttle renders such influence on the accelerometer of the present invention minimal and thus the system is substantially acceleration responsive.

As previously indicated, the diffuser 46 of the vortex valve may be eliminated if a wide range of control is not required. The specification refers only to wheeled vehicles but it is obvious that shock absorbers are utilized in many vehicles and in many non-vehicle applications. The apparatus of the present invention is of general utility and may be utilized in any shock absorber application. The accelerometer disclosed herein is only one mechanism, albeit a convenient one, for producing fluid signals as a function of acceleration and other such accelerometers are known in the art and may be utilized. It should be noted that where desirable the piston valve 8 may also include a vortex throttle to provide a variable orifice effect during extension of the shock absorber. In such case the accelerometer monitors body acceleration rather than wheel acceleration and should call for damping proportional to absolute body acceleration level.

While I have described and illustrated specic embodiments of our invention, it will be clear that variations of the details of construction which are specifically illustrated and described may be resorted to without department from the true spirit and scope of the invention as defined in the appended claims.

What I claim is:

1. A compression valve for a shock absorber having a compression chamber said compression valve comprising a vortex chamber for controlling flow out of the compression chamber into a reservoir of the shock absorber partly filled with a compressible fluid, said vortex valve having a substantially radial fluid input and a substantially tangential fluid input, means for supplying fluid to said inputs, an accelerometer and means responsive to said accelerometer for decreasing fluid input to said tangential fluid input as a function of increasing acceleration, said accelerometer and said last mentioned means comprising a mass, spring means for biasing said mass to a first position, first and second ports communicating with said radial and said tangential fluid inputs, respectively, said first and second ports being closed and open respectively, to fluid flow by said mass when in said first position and being increasingly opened and closed by said mass as a function of increases in acceleration, said mass comprising a central hollow tube; a body having a central cylindrical aperture for receiving said hollow tube, said body having means for communicating with said first input, said first port being an opening through said hollow tube.

2. The combination according to claim 1 wherein said mass further comprises a member with three arms coaxial with said hollow tube, said arms spaced at 120° relative to one another, each said arm extending into respective cylindrical apertures in said body.

3. The combination according to claim 2 wherein said body has three passages each extending from a different one of said last mentioned cylindrical apertures and said tangential inlets, said second ports being openings in said hollow tube in communication with said passages.

4. The combination according to claim 3 wherein said passages each comprises a fluid amplifier having a power nozzle, opposed control ports and a pair of output passages, one output passage of each fluid amplifier communicating with one of said fluid inputs to said vortex amplifier and the other of the output passages of each fluid amplifier communicating with the other of said fluid inputs to said vortex amplifier.

5. The combination according to claim 1 wherein said vortex chamber has a centrally located egress orifice and a diffuser extending outwardly from said orifice.

6. The combination according to claim 1 wherein said compression valve further includes a by-pass valve extending between said chambers, said valve being normally closed and being opened at velocities over a predetermined minimum.

* * * * *